L. GREGSON.
TOOL SOCKET.
APPLICATION FILED MAY 17, 1909.
972,105.
Patented Oct. 4, 1910.
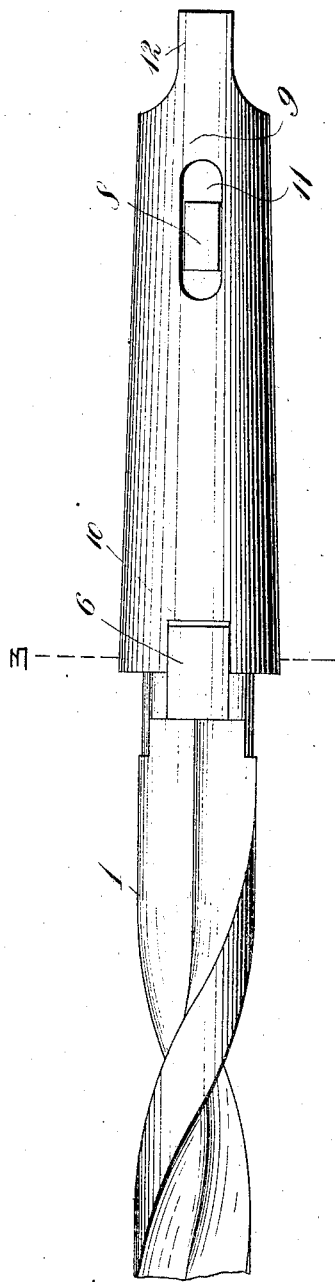
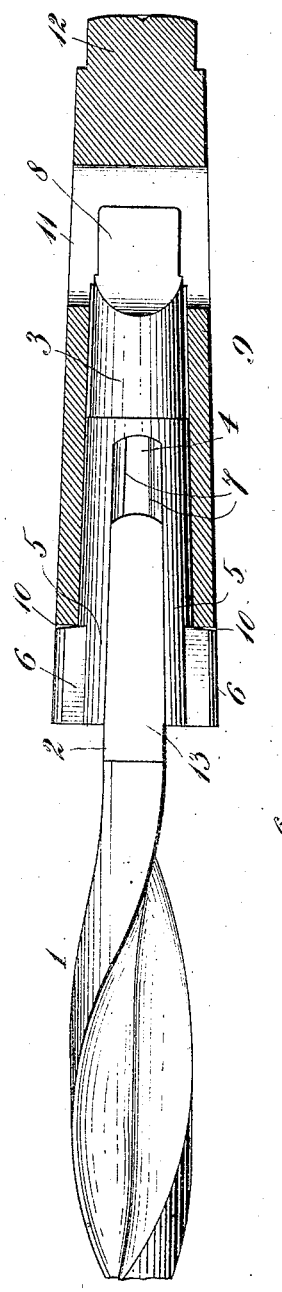
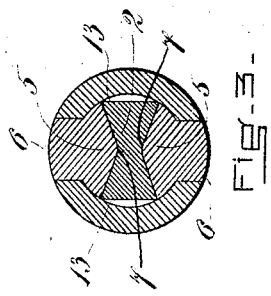
WITNESSES:
INVENTOR
Lewis Gregson
by Browne & Woodworth
attys

UNITED STATES PATENT OFFICE.

LEWIS GREGSON, OF NEW BEDFORD, MASSACHUSETTS, ASSIGNOR TO MORSE TWIST DRILL & MACHINE COMPANY, OF NEW BEDFORD, MASSACHUSETTS.

TOOL-SOCKET.

972,105.  Specification of Letters Patent.  Patented Oct. 4, 1910.

Application filed May 17, 1909. Serial No. 496,399.

*To all whom it may concern:*

Be it known that I, LEWIS GREGSON, a citizen of the United States, and a resident of New Bedford, in the county of Bristol and State of Massachusetts, have invented a new and useful Improvement in Tool-Sockets, of which the following is a specification.

My invention relates to tool-sockets for rotating cutting-tools such as twist drills.

The object of my invention is to provide means for holding a rotating tool having a shank of no-circular section in such manner as to prevent relative motion between the tool and socket without subjecting the shank to the liability of breaking under torsional strain.

I have invented a new twist drill formed of a four-sided strip of tool-steel, such as tungsten-steel, having a cross-section thinner at the middle than at the edges thereof, a part of the strip being twisted to form the drill and the remainder left flat to form the drill-shank; and the present invention will be described specifically in connection with said drill although it will be undrestood that it is not limited to use therewith. I make no claim for this drill in this application inasmuch as the same forms the subject matter of my application Serial No. 496,398 filed simultaneonsly herewith.

In the drawings which accompany and form a part of the present specification, I have shown one embodiment of my invention which has given good results in practice; but it will be understood that many modifications may be made therein without departing from the spirit of my invention.

Figure 1 is a side view of a drill and socket made in accordance with my invention. Fig. 2 is a longitudinal section of the drill and socket shown in Fig. 1, and Fig. 3 is a cross-section taken on the line 3—3 of Fig. 1.

In the drawings selected for more fully describing my invention, 1 represents a twist drill produced by twisting a strip of metal, the cross-section of which is thinner at the middle than at the ends, as indicated at 2 which represents the shank of said drill.

3 is a sleeve slotted at 4 throughout a portion of its length to form the two oppositely-arranged and longitudinally-extending jaws 5 5, each of which is provided at its forward end with a projection 6. Each jaw is beveled as shown most clearly in Fig. 3 to take the four-sided grooved shank 2, the points 7 7 of each jaw coöperating with the thinnest portion of the shank 2. The jaws 5 5 of the sleeve may conveniently be formed by a swaging tool of appropriate shape.

In Figs. 1 and 2 the shank is shown as inserted only part way into the slot 4, so that the interior construction may be more readily seen, but it will be understood that in operation the end of the shank rests against the rear wall of the slot.

The rear end of the sleeve may be provided with a tang 8 which fits into a transverse slot 11 passing through the socket 9. The function of this tang however is merely to afford a means for facilitating the ready removal of the sleeve from the socket and it is not intended as a drive for the drill. The outer walls of the sleeve are tapered throughout a portion of their length so as to closely fit the socket 9, and the projections 6, 6, on the forward end of the sleeve take into the oppositely disposed recesses 10, 10, on the forward end of the socket, thereby affording a more effective drive for the drill than would be secured by the tang 8. The socket may be provided with a tang in the usual manner.

The opposite edges 13, 13 of the shank may be flattened as shown so as to relieve the shank of any strain that otherwise would be caused by friction between it and the socket.

In operation, the drill shank is first inserted between the jaws of the sleeve through to the end of the slot 4, the jaws by their elasticity firmly holding the shank, and the shank is then inserted in the sleeve so that the projections 6, 6 engage the recesses 10, 10, respectively.

It will be understood that by providing means for holding a drill having a grooved shank, I am enabled greatly to cheapen the cost of such drills, inasmuch as the latter need not be provided with permanent shanks of circular section, and that by providing a drive at the forward portion of the shank instead of employing the usual rearwardly situated tang, I greatly decrease the liability of breaking the shank when the latter is subjected to severe torsional strain.

I claim:

1. In combination, a socket for a rotating cutting-tool provided with two oppositely disposed recesses in the forward end thereof, a sleeve arranged within said socket said sleeve being slotted throughout a portion of its length to form two oppositely-disposed longitudinally-extending jaws constructed to receive the non-circular shank of a cutting-tool, and a projection on the forward end of each of said jaws fitting into one of said recesses.

2. In combination, a socket for a rotating cutting-tool provided with two oppositely-disposed recesses in the forward end thereof, a sleeve arranged within said socket, said sleeve being slotted throughout a portion of its length to form two oppositely-disposed longitudinally-extending jaws beveled to receive a shank having a cross-section thinner at the middle than at the edges thereof and a projection on the forward end of each of said jaws fitting into one of said recesses.

In testimony whereof, I have hereunto subscribed my name this 13th day of May 1909.

LEWIS GREGSON.

Witnesses:
 WANTON M. GLADDING,
 CHARLES B. THOMPSON.